May 3, 1938.  J. D. CHRISTIAN  2,116,166
SPEED CHANGE DEVICE
Filed July 1, 1937   4 Sheets-Sheet 1
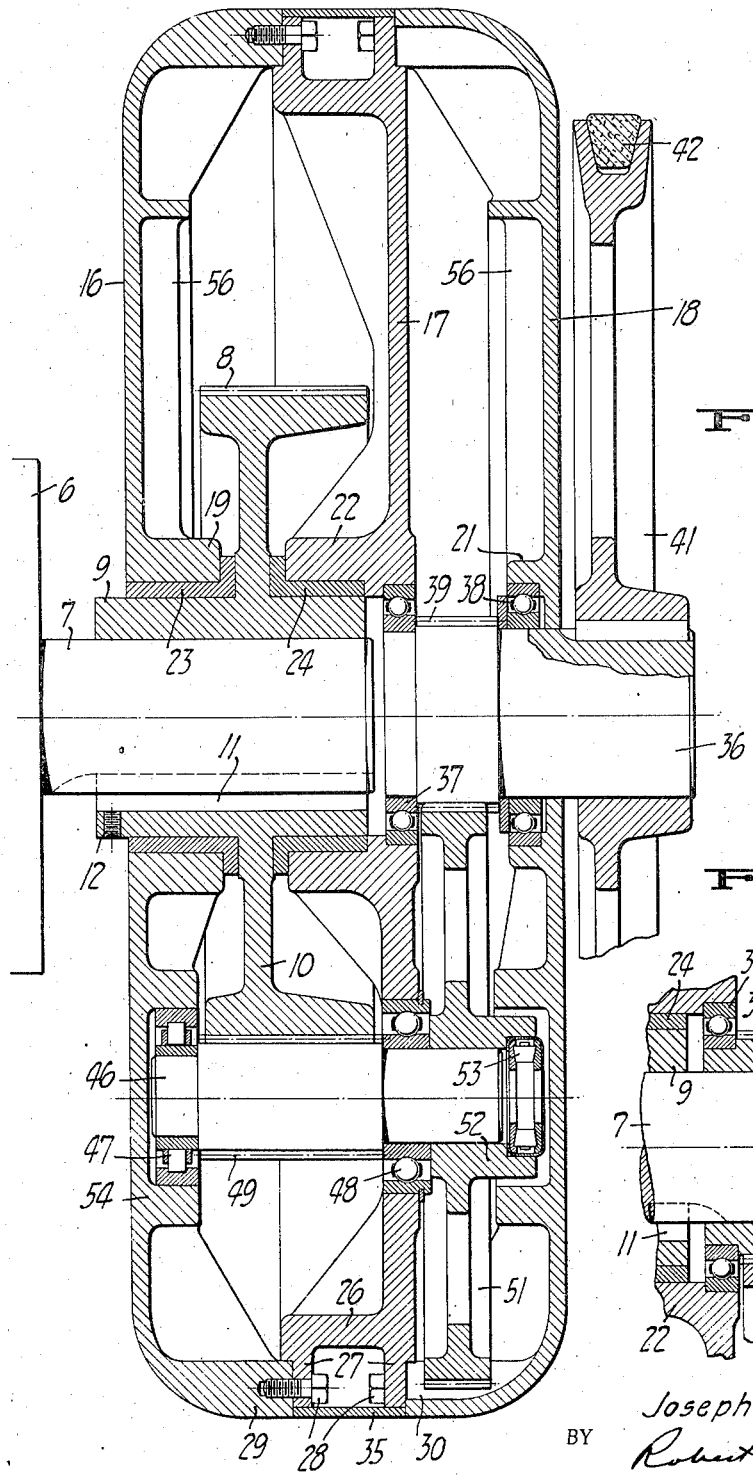
FIG_1_
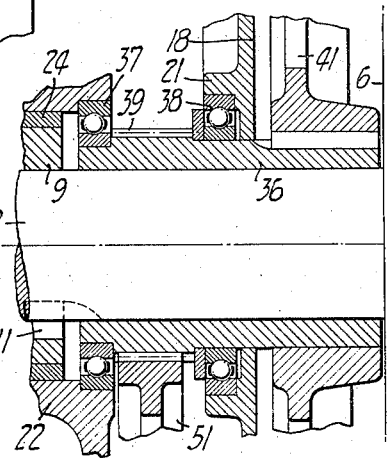
FIG_2_
INVENTOR.
Joseph D. Christian
BY Robert H. Eckhoff
ATTORNEY.

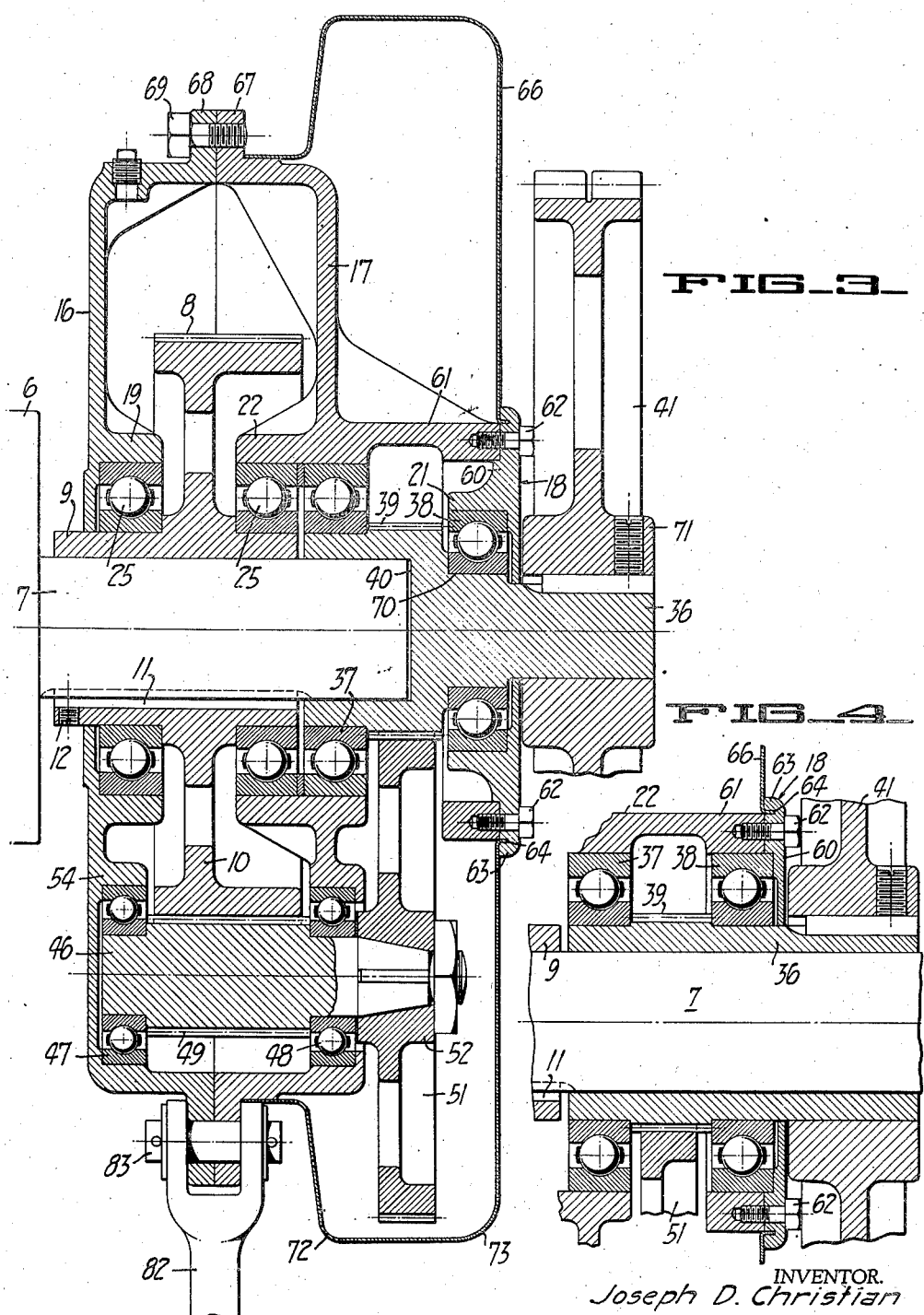

May 3, 1938.　　　J. D. CHRISTIAN　　　2,116,166
SPEED CHANGE DEVICE
Filed July 1, 1937　　　4 Sheets-Sheet 3

INVENTOR.
Joseph D. Christian
BY Robert H. Eckhoff
ATTORNEY.

May 3, 1938.  J. D. CHRISTIAN  2,116,166
SPEED CHANGE DEVICE
Filed July 1, 1937  4 Sheets-Sheet 4
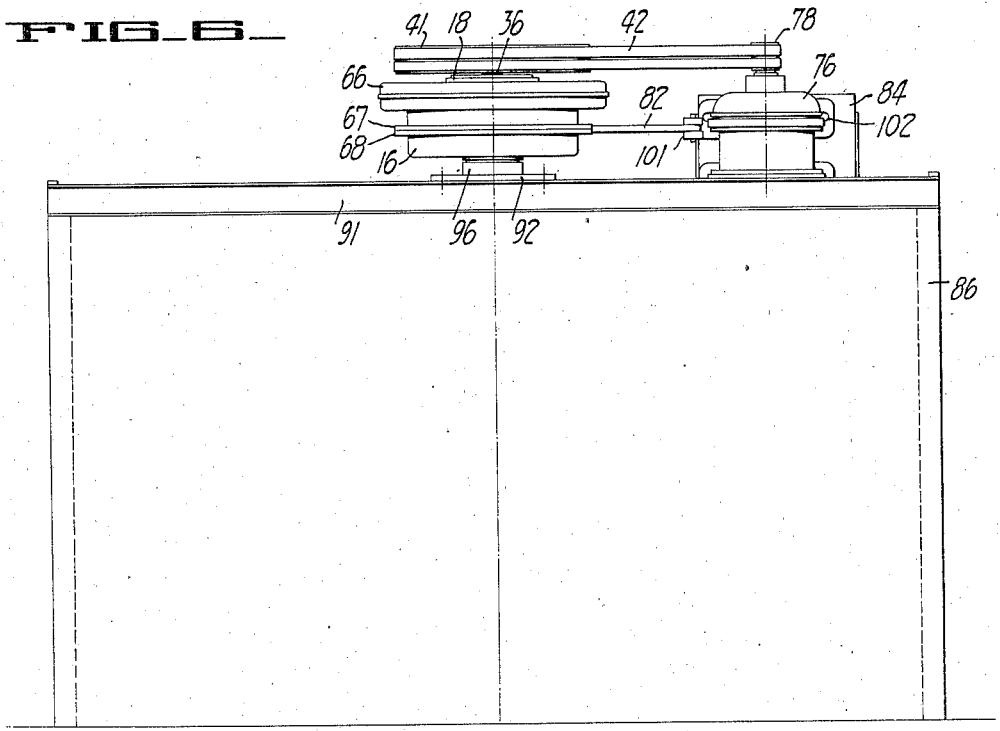
FIG_6_
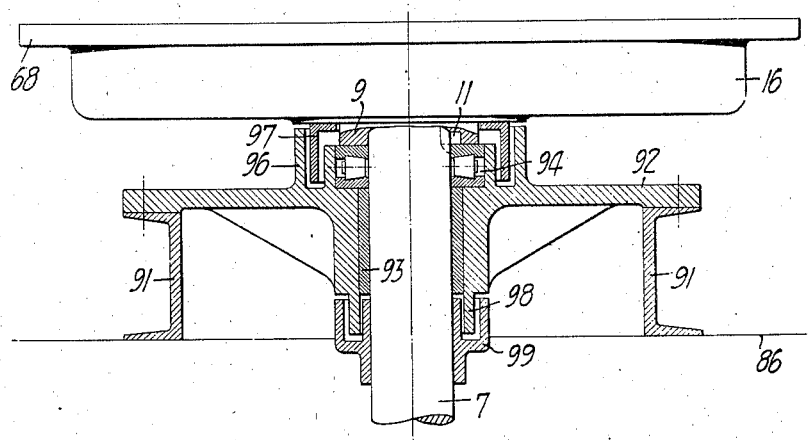
FIG_7_
INVENTOR.
Joseph D. Christian
BY Robert H. Eckhoff
ATTORNEY.

Patented May 3, 1938

2,116,166

UNITED STATES PATENT OFFICE 2,116,166

SPEED CHANGE DEVICE

Joseph D. Christian, San Francisco, Calif.

Application July 1, 1937, Serial No. 151,532

8 Claims. (Cl. 74—421)

In my prior application Serial No. 113,246, filed November 28, 1936, I disclosed a self contained speed change device adapted to be mounted directly upon a shaft of a driven unit, in combination with means for effecting a primary change in speed between the prime mover and the speed change device proper. This invention relates to a new and improved construction of the device generally disclosed in the aforementioned application.

In said application I have disclosed a structure in which primary support for the speed change unit is provided by the shaft of the unit to be driven. This support is provided without any supporting base upon the speed change unit so that the entire weight of this unit is taken by the supporting shaft which is in turn driven by the speed change unit. The structure shown in said application is further characterized in that a gear having an overhanging face is utilized, this gear having a hub upon which is rotatably mounted the support casing. The connection between the gear hub and the support casing is by means of a bearing structure which is inserted and fits onto the hub beneath the overhanging gear face to the end that the device is self contained, compact, and unit form, whether on or off the supporting shaft. This connection, the connection between the gear hub and the supporting casing in said application, can be either between an outside or an intermediate wall in the support casing. In this application I have disclosed the utilization of a gear having an overhanging face on both sides of the gear web. The support casing for the entire device is mounted upon each side of the web of the gear to the end that the load of the support casing is adequately distributed over the gear hub while the device is compact, self contained and an assembled unit even when removed from the supporting shaft.

It is the general object of the present invention to provide a commercially practical structure, one characterized by its simplicity in design and manufacture so that a satisfactory structure can be turned out at relatively low cost.

The invention includes other objects and features of advantage in addition to the foregoing, some of which, together with the foregoing, will appear hereinafter, wherein the present preferred structure of this invention is disclosed.

In the drawings accompanying and forming a part hereof, Figure 1 is a vertical section taken through the device embodying my invention.

Figure 2 is a fragmentary section illustrating a modified structure.

Figure 3 illustrates another modification particularly characterized in that it enables a light spun steel cover to be employed, thus eliminating a considerable portion of the heavy castings used heretofore in such units.

Figure 4 is a modification shown as a fragmentary section of that structure shown in Figure 3.

Figure 6 is a side elevation illustrating utilization of a unit when assembled.

Figure 7 is a side elevation, partly in section, of a portion of the assembly of the unit mounted in Figure 6.

Figure 5:
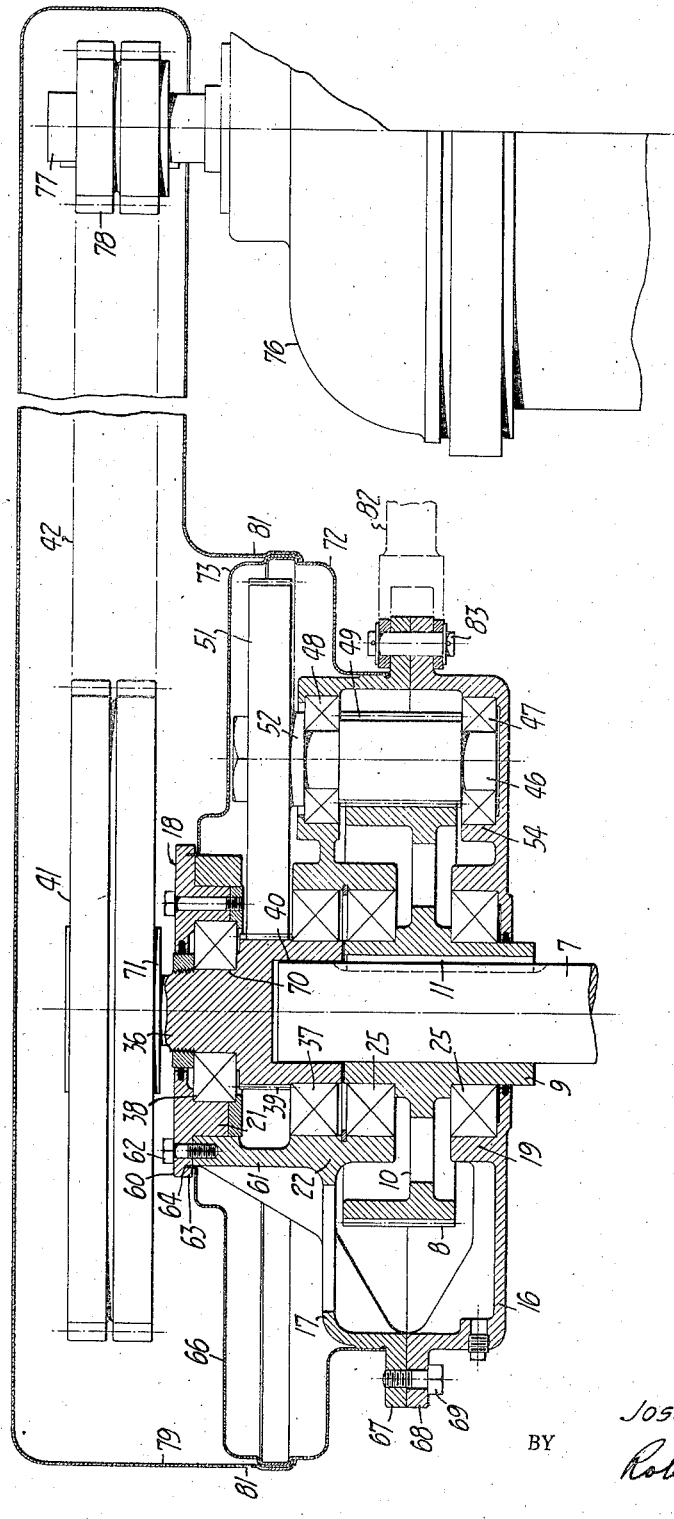
Figure 5 is a plan view, partly in section, illustrating in a diagrammatic manner an assembly of such a unit as that shown in section in Figure 3 in combination with a motor or other prime mover.

In the drawings accompanying and forming a part hereof, I have shown a driven unit generally at 6. From this unit a shaft 7 extends, this shaft being the power input element to the unit to be driven. This shaft supports entirely the speed change device to be presently described.

In accordance with this invention, the entire speed reducer unit is mounted upon the extending shaft, and the load thereof is borne by the unit 6. To effect this I provide upon the shaft 7 a gear generally indicated at 8. This gear includes a hub 9 mounted upon the shaft. The hub is secured to the shaft by a key 11 which is retained in place by set screw 12. The gear hub 9 includes a gear web 10 intermediate the ends of the hub and the overhanging gear face.

In accordance with this invention, a suitable casing structure is provided. This casing structure includes three members providing a first wall 16, a second wall 17, and a third wall 18. These walls are substantially parallel to each other and are spaced apart with the second wall 17 between the first and third walls 16 and 18.

In Figures 1 and 2 the members providing walls 16 and 18 are shown as substantially identical; they can be made from the same pattern. As a matter of fact, the only difference between the members providing walls 16 and 18 in Figure 1 is that the inwardly extending boss, formed on wall 16 as a flange, is slightly longer than the corresponding boss 21 on member 18. This can of course be cared for in the pattern by providing a removable section thereon. The flange 19 on member 16 and the flange 21 on wall 18 are of course machined to suit the individual bearing units associated therewith. The second or intermediate wall 17 includes a flange 22 thereon.

It is a feature of this invention that the flanges 19 and 22 extend toward each other and provide mountings for bearing means 23 and 24 on opposite sides of the gear hub 9.

The casing structure provided by walls 16 and 17 and 18 is ordinarily made as light as possible, and I have successfully employed aluminum, although light weight alloys can be used. The bearing means 23 and 24 between flanges 19 and 22 and the hub are best made with a coefficient of expansion closely approximating that of the casing. I have successfully used a cast bearing structure made of bronze because I have found that, with the construction disclosed, the unit pressure on the bearing is reduced to an extent sufficient to permit such a bearing to be employed successfully. It is not necessary to utilize expensive ball or roller bearings at this point with the construction disclosed although these are indicated at 25 in Figure 3.

The three members (Figures 1 and 2) providing walls 16, 17 and 18 are suitably secured together. To this end, the intermediate wall member is flanged as at 26. Upon this flange is formed a rim 27 opposite to the wall member itself, so that, in effect, an annular channel is provided about the periphery of the structure which is substantially of a "U" cross section. Bolts 28 are passed through suitable apertures and are received in flanges 29 and 30 respectively provided on members 16 and 18 to secure the members together as a unit. A ring member 35 is fitted into the annular channel as a cover.

In accordance with my invention, I provide for mounting of the power input or drive shaft 36 in the casing in such a way that adequate support is provided therefor, and yet the total width of the unit is not increased. To accomplish this, I provide a first bearing 37 in the wall 17, while a second bearing 38 is provided in the wall 18. These bearings are shown as of the ball bearing type, although other types of bearing can be used. On the shaft 36 and intermediate the two bearings I provide a pinion gear 39. This gear can be either formed directly upon the shaft 36 or else formed separately and secured thereto.

It is to be noted in Figure 1 in the drawings that I have shown the shaft 7 slightly smaller than the shaft 36. However, this need not be followed strictly, inasmuch as shaft 7 can be the same size as shaft 36 and even larger as in Figure 3 wherein a receptacle 40 is formed for shaft 7. However, having the shaft 36 relatively small in diameter enables the gear 39 to be made likewise of small diameter, and greater speed change secured, since it is the comparative size of gears 39 and 8 that determines in the end the primary reduction effected through the unit.

In Figures 2 and 4 I have shown shaft 36 as hollow, with the shaft 7 extending therethrough. This is of course a permissible variation within the contemplation of the present invention, enabling the structure to be readily employed for the driving of line shafts and the like. It is to be further pointed out that while the present construction enables a hollow shaft 36 to be readily employed, other constructions in which hollow shafts are employed as the input shaft do not necessarily permit of the advantageous construction shown in Figures 1 and 3.

Mounted upon the extending end of shaft 36 I have shown a suitable power input means as the V belt pulley in Figure 1 or the sprocket of Figure 3 about which is extended a V belt or chain 42 extending to a suitable prime mover, such as a motor or the like, 76 in Figure 5. In the construction shown in Figure 1, the input pulley 41 is shown at some distance from the supporting device 6. This means that the reactive force applied to drive the pulley 41 has a moment about the bearings provided in structure 6 for shaft 7. Ordinarily this will not be of any particular consideration because the various units of the structure are so mounted that deflection between them cannot occur, and so that the whole structure is adequately mounted upon shaft 7. However, in some instances, consideration will have to be given to this factor, and in Figure 2 I have shown a unit incorporating features reducing the moment arm length about unit 6. In this structure I have shown the input pulley 41 as provided adjacent to the unit 6, and the shaft 36 hollow. In fact a slight clearance exists between the shaft 36 and shaft 7 and shaft 36 does not derive any support from shaft 7. This places the input reactive force directly adjacent to the unit 6; the moment of the force acting against the bearings supporting the shafts is relatively small as compared to that moment which can exist when the structure is merely supported after the manner of Figures 1 and 3.

I have heretofore mentioned that gears 39 and 8 were employed. These respectively constitute the first and second gears mentioned herein. To provide for the transmission of power between these gears, and to effect the reduction in speed, I mount a shaft 46 in suitable bearings 47 and 48 provided in walls 16 and 17. Shaft 46 carries a pinion gear 49 which engages gear 8. On the extending end of shaft 46 I mount another gear 51 which meshes with gear 39. Gear 51 includes a hub 52 thereon extending beyond the end of shaft 46. Within this hub I mount a thrust bearing 53 to take up any thrust that may be placed upon shaft 46. (Figure 1).

The bearing 47 is mounted in a suitable receptacle 54 formed upon and extending from the wall 16. This receptacle also appears upon wall 18 in Figure 1, providing a receptacle into which the hub 52 of the gear 51 is received without increasing the over-all width of the unit.

The members providing walls 16 and 18 are suitably flanged as at 56 to join the various portions of the members together to ensure stability, strength and rigidity, and to provide adequate support for all the bearings in the unit.

In that construction shown in Figures 3 and 4, wall 18 is mounted upon a generally annular extension of wall 17, this extension being indicated at 61 in the drawings and being partly cut away to admit gear 51. The member 60 providing wall 18 is secured to the extension 61 by screws 62. An overhanging lip 63 having a receptacle 64 therein is formed on member 60 to receive the turned up edge of a spun metal cover 66. This cover is positioned between the member 60 and a flange 67 formed upon and extending about the periphery of the member providing wall 17. A flange 68 is formed upon the member providing wall 16, the two flanges being secured together as by screws 69 to secure the unit together.

The screws 62 force the cover to spring into place whereby an oil tight seal is provided between the cover and the casing proper.

The cover 66 is made of light sheet steel. This enables the weight of the entire unit to be reduced and yet a satisfactory unit provided. By reason of the resilient nature of the steel, the annular shape of the cover, and the inclusion of turned or flanged portions 72 and 73, the unit is strong, yet light and resilient.

In Figure 3 I have shown shaft 36 as carrying bearing 38 upon a reduced portion 71 thereof, and sprocket 41 as having a relatively small hub 72. Because shaft 36 is relatively small in mass, it can be readily manufactured as a special part to accommodate sprockets, pulleys or gears of various hub size, bearing 38 and plate 18 being readily accommodated to this.

In Figure 5 I have shown the unit in combination with a prime mover such as an electric motor 76 having a drive shaft 77 carrying a sprocket 78 thereon. A metal casing, indicated generally at 79, is formed with an annular portion 81 engaging and fitting upon the spun metal case 66. This case extends to surround the sprocket 78 upon the motor shaft so that an entire unit, enclosed to protect the workman, is provided. Such a case also protects the sprockets and chains, suitable lubricating means being provided for the chain if desired as a drip oil feed.

Since the speed change units are mounted upon a shaft without a base, suitable means are provided to resist their reactive torque. This is usually accomplished by attaching an arm 82 to the case and by extending a pin 83 through suitable apertures provided in the ends of the arms and through an aperture in the flanges 67 and 68 on the case. The arm is extended to a suitable support. For example, in Figure 6 I have shown it as extending to and engaging an ear 101 on motor base 76. The motor 76 is slidable along support 84, slots 102 in the base of the motor cooperating with suitable studs (not shown) to hold and position the motor. Reactive torque causes arm 82 to push the motor base away from the unit and increase the center to center distance so that the tension on the belt is increased.

Referring to Figures 6 and 7, these illustrate one of the many uses to which a unit of this type can be placed. As appears there, a support structure 84 is mounted upon the side of a tank 86. Motor 76 is mounted upon this support, while the unit is mounted upon shaft 7 which is supported in a support structure provided by channels 91 and plate 92. Plate 92 carries a suitable bearing 93 supporting the shaft 7 for rotation. Shaft 7 can depend into the tank to rotate, for example, an agitator, as in a mayonnaise tank. Hub 9 engages a thrust bearing 94. A receptacle 96 is formed upon the upper surface of plate 92 and an annular member 97 is mounted upon that member providing wall 16 to depend into the receptacle 96. Receptacle 96 is usually filled with a suitable sealing liquid, such as mercury.

A similar sealing receptacle is formed beneath bearing 93, the plate continuing with a depending annulus 98 formed thereon and spaced from the shaft 7, this annulus extending into a receptacle provided by member 99. The receptacle in member 99 is usually filled with mercury to provide a second seal, to ensure lubricating oil does not find its way into the tank contents.

From the foregoing I believe that it will be apparent that I have provided a novel, self contained unit characterized by simplicity of manufacture, low weight per unit horse power transmitted, ease of manufacture and simplicity of construction.

The sheet metal case enables the unit weight to be decreased 30 to 40%. This decrease is even more effective because it is from the outboard side of the unit (Figure 3), where the extending shaft is unsupported. The primary reduction enables the gearing in the case to be run at lower speed and therefore more efficiently, particularly in the case of helical gearing.

This case is a continuation in part of my applications Ser. No's. 113,246 and 113,247 of November 28, 1936, the sheet metal case feature being shown in my prior application Ser. No. 113,247.

I claim:

1. In a device of the character described, a first shaft, a first gear having a hub connected to a gear portion by a web, means securing said gear on said shaft, a casing structure including a first, a second and a third wall, said walls being substantially parallel and spaced apart, bearing means supporting said first wall on said gear hub on one side of said web, bearing means supporting said second wall on said gear hub on the other side of said web, a second shaft, bearing means in said second wall for said second shaft, bearing means in said third wall for said second shaft, gear means on said second shaft between said two last mentioned bearing means, and gearing connecting said first and second gears to effect a speed change therebetween.

2. In a device of the character described, a first shaft, a first gear having a hub connected to a gear portion by a web, means securing said gear on said shaft, a casing structure including a first, a second and a third wall, said walls being substantially parallel and spaced apart, said first and second walls being flanged along said first shaft with the flanges extending toward each other, bearing means supporting said first wall on said gear hub on one side of said web, between the flange on said first wall and said hub, bearing means supporting said second wall on said gear hub on the other side of said web between the flange on said second wall and said hub, a second shaft, bearing means in said second wall for said second shaft, bearing means in said third wall for said second shaft, gear means on said second shaft between said two last mentioned bearing means, and gearing connecting said first and second gears to effect a speed change therebetween.

3. In a device of the character described, a first shaft, a first gear having a hub connected to a gear portion by a web, means securing said gear on said shaft, a casing structure including a first, a second and a third wall, said walls being substantially parallel and spaced apart, bearing means supporting said first wall on said gear hub on one side of said web, bearing means supporting said second wall on said gear hub on the other side of said web, a second shaft, bearing means in said second wall for said second shaft, bearing means in said third wall for said second shaft, gear means on said second shaft between said two last mentioned bearing means, a third shaft mounted in said first and second walls with an end thereof extending beyond said second wall, and gearing carried on said end and on said last mentioned shaft and connecting said first and second gears.

4. In combination, a first wall member, a second wall member, each of said members having a portion extending toward the other, a bearing means supported in each extending portion, a first gear having a face overhanging the extending portions and a hollow hub mounted for rotation in said bearing means, a third wall member, an extension on said second wall member supporting said third wall member, a shaft substantially coaxial with said hub, bearing means in said second wall member and said third wall member for supporting said shaft, a second gear on said shaft between said supporting bearing means, and gearing connecting said first and second gears.

5. In combination, a first wall member, a second wall member, each of said members having a portion extending toward the other, a bearing means supported in each extending portion, a first gear having a face overhanging the extending portions and a hollow hub mounted for rotation in said bearing means, a third wall member, an extension on said second wall member supporting said third wall member, a shaft substantially coaxial with said hub, said shaft being relieved at least partially to admit an end of a support shaft passed through said hub, bearing means in said second wall member and said third wall member for supporting said shaft, a second gear on said shaft between said two last mentioned bearing means, and gearing connecting said first and second gears.

6. In a device of the character described, a housing and support structure having a substantially continuous peripheral flange circular in form extending therefrom at a point spaced from at least one side of said housing and support structure, a member carried by said housing and support structure and having a substantially circular peripheral flange thereon substantially concentric with said first mentioned flange but in a plane substantially parallel to but spaced from the plane of said first mentioned flange, and a substantially circular sheet metal housing having a central rim and opposite sides substantially parallel to each other and depending from said rim, one side being engaged with the flange on said housing and the other side being engaged with the flange on the member.

7. In a device of the character described, a housing and support structure having a substantially continuous peripheral flange extending therefrom at a point spaced from at least one side of said housing and support structure, a member carried by said housing and support structure and having a substantially circular peripheral flange thereon, a substantially circular sheet metal housing having a central rim and opposite sides substantially parallel to each other and depending from said rim, one side being engaged with the flange on said housing and the other side being engaged with the flange on the member, and means for securing said member to said housing and support structure to move said opposite housing sides together and compress said housing whereby a tight junction is provided between the housing sides and the flanges engaging the same.

8. In a device of the character described, a housing and support structure including an outside wall on one side of said housing and a housing extension on the other side of said housing, an outside wall member carried by said extension, and a sheet metal housing having a rim portion and opposite sides thereon extending inwardly from the rim and normally away from each other, said housing sides being engaged with and flexed so as to be substantially parallel between said outside wall member and said housing and support structure.

JOSEPH D. CHRISTIAN.